April 18, 1939.  L. A. MEISSE  2,155,234

CONDUCTOR SUPPORT

Filed Sept. 16, 1937

Inventor
LOUIS A. MEISSE

By

Attorney

Patented Apr. 18, 1939

2,155,234

UNITED STATES PATENT OFFICE 2,155,234

CONDUCTOR SUPPORT

Louis A. Meisse, Mansfield, Ohio, assignor to The Ohio Brass Company, Mansfield, Ohio, a corporation of New Jersey Application September 16, 1937, Serial No. 164,230

8 Claims. (Cl. 191—40)

My invention relates to supports for conductors and in particular, supports for trolley wires.

The object of my invention is to provide a spring hanger to greatly reduce or eliminate arcing between a passing current collector and the trolley wire at the point of suspension due to so-called hard spots.

Another object is to provide a spring hanger which will compensate for a variation in the upward pressure of the collector in excess of and opposite to the downward pressure or load of the trolley wire at the point of suspension.

Another object of my invention is to provide a spring hanger in which the spring constant of the spring will be decreased as the load on the device is increased.

Spring hangers as made in the past have been provided with helical springs and elongated flat springs, with no means to compensate or adjust the spring constant in conformity with the load to which the device is subjected with the result that the helical spring becomes solid at the higher loads and the flat spring must have a low spring constant therefore the amount of movement due to a passing current collector is very small.

My invention will automatically decrease the spring constant from that of the normal spring, depending upon conditions of load.

With my invention I am able to equip the spring hanger with a spring having normally a relatively higher spring constant (large movement per unit of applied force) over a limited range of deflection and to decrease the spring constant if the deflection is exceeded.

My invention resides in the new and novel construction, combination and relation of the parts hereinafter described and shown in the drawing.

Figure 1:
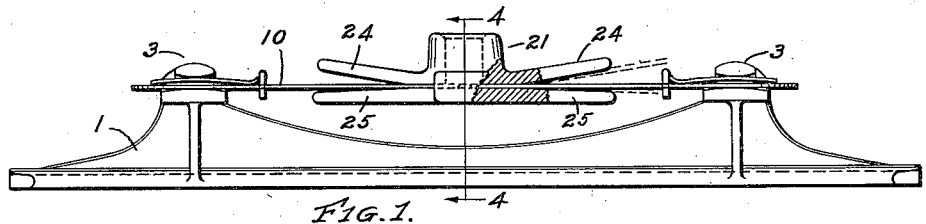
Fig. 1 is a side view of my invention.
Figure 2:
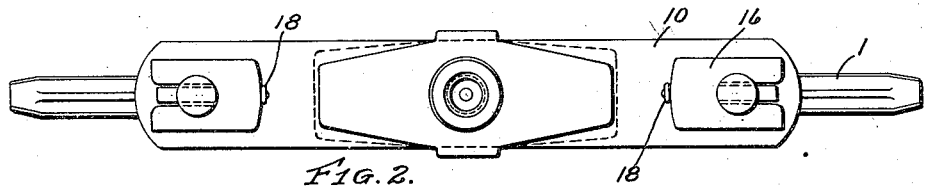
Fig. 2 is a top view of my invention shown in Fig. 1.
Figure 3:
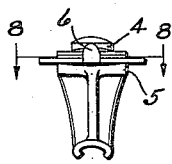
Fig. 3 is an end view of my invention as shown in Figs. 1 and 2.
Figure 4:
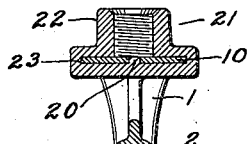
Fig. 4 is a transverse sectional view on the line 4—4 of Fig. 1.
Figure 5:
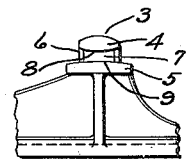
Fig. 5 is a side view of a portion only of the trolley ear to show the attaching boss.
Figure 6:
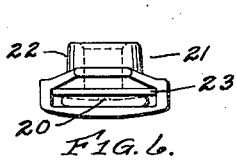
Fig. 6 is an end view of the suspending member.
Figure 7:
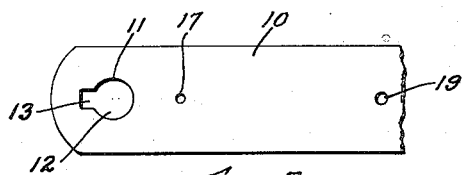
Fig. 7 is a top view of one end only of the spring shown in Figs. 1 and 2.
Figure 8:
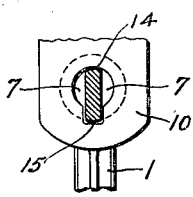
Fig. 8 is section on the line 8—8 of Fig. 3.

In the preferred embodiment of my invention I make use of a trolley ear or clamp 1 provided with a groove 2 to receive and grip a trolley wire and also having spaced supports 3, each provided with a head or flange 4 connected to the flange 5 by means of the connecting member 6 which forms with the head 4 and the flange 5 oppositely disposed grooves 7.

The lower face 8 of the head 4 is convexed on each side of the member 6 and the upper face 9 of the flange 5 is likewise convexed.

I further make use of a spring supporting member 10 preferably of heat treated steel and the spring is provided with spaced openings 11, each provided with an enlarged portion 12 and a reduced portion 13, through which may be passed the head 4 and connecting portion 6.

The supports 3 are so spaced with respect to the openings 11 that when the spring and ear are assembled spaces 14 and 15 will be provided to permit relative longitudinal movement of the spring and ear under variations of loading.

The spring and ear portions are held together by means of slotted members 16 made preferably of phosphor bronze and curved to give spring action. The member 16 binds and locks the members 1 and 10 together and prevents relative movement between the parts except longitudinal movement.

The spring member 10 is provided with an opening 17 adjacent each end in which is secured a rivet 18 against which an end of the member 16 abuts thus holding the member 16 in position.

The spring 10 is also provided with a central opening 19 to receive the stud 20 of the suspending member 21 which is provided with a threaded boss 22 by means of which the device is secured to an overhead support. The member 22 is provided with a slot 23 which is originally formed of sufficient width such that the stud 20 will not interfere with the passing of the spring 10 into position, after which the parts are pressed together with the stud 20 in position in the opening 19 thus locking the parts against relative movement.

The suspending member 21 is provided with projecting arms 24 and 25. These arms may be made of such length as required and also may have such curvature as required to meet conditions.

It will be apparent that the weight of the trolley wire upon the device will bow the spring ends downwardly and that a passing current collector will bow the spring ends upwardly. The trolley wire load may for example amount to 6 to 10 lbs. depending upon conditions while the upward pressure of the current collector may amount to 35 to 45 lbs. depending upon the tension of the springs in the trolley base supporting the collector.

It will be evident that the upward movement from normal (the position taken by the spring when subject to no load either upwardly or downwardly) will be greater than the downward movement from normal, of the spring ends due to the difference in loading.

It will also be evident that as the spring ends move either upwardly or downwardly from normal it will change its contact point with the arms 24 and 25 such that the greater the movement the nearer the end of the arms 24 and 25 will move the contact point between the arms and the spring thus shortening the effective spring length and thereby decreasing the spring constant which is the equivalent of stiffening the spring to better resist the increased loadings upon the device.

With the invention above described, the spring ear will under all conditions act as a resilient support, never reaching the conditions of a rigid support, but the spring constant will decrease gradually from its maximum value to one that can support both the trolley wire and the impact force in excess of the usual and still retain a limited amount of yield.

Having disclosed my invention, I claim:

1. The combination with a conductor hanger, comprising an elongated spring member formed from flat spring material and having spaced openings, one at each end of the member, an elongated conductor holding member having conductor receiving means along one edge and a pair of spaced projections, one adjacent each end of the holding member registering with the openings in the spring member, means extending through the openings to attach the holding member to the spring member, a suspension member secured to the spring member intermediate its end, of means to change the spring constant with a change in load conditions upon the hanger, the said means comprising arms projecting from opposite sides of the suspension member and in the general direction of the spring members and so constructed and arranged relative to the suspension and spring members as to gradually decrease the spring constant when pressure is applied to the holding members from below and means associated with the suspension member to secure the hanger to a support.

2. The combination with a conductor hanger comprising an elongated member formed from flat spring metal and having spaced openings, one at each end of the member, a conductor holder comprising an elongated body having a conductor receiving groove and holding means along one edge, means extending through the openings to secure the said member and body together in relative movable relation, a suspension member attached to the spring member and having means to secure the member to a support, of arms projecting longitudinally from opposite sides of the suspension member in predetermined spaced relation to the spring member, the arms adapted to be engaged by the spring member when loaded from below by a passing current collector whereby the spring constant is decreased as the upward pressure of the load increases.

3. A conductor hanger comprising an elongated spring member, a suspension member attached to the spring member and having means to secure the hanger to an overhead support, arms projecting longitudinally from opposite sides of the suspension member in predetermined spaced relation to the normal position of the spring and arranged to be engaged by the spring member to change the spring constant depending upon the load to which the conductor holding member is subjected and a conductor holding member secured to the spring member at spaced points.

4. A conductor hanger comprising an elongated spring member, a suspension member attached to the spring member and having means to secure the hanger to an overhead support, arms projecting longitudinally from opposite sides of the suspension member both above and below the spring member in predetermined divergent relation to the spring and arranged to be engaged by the spring member whereby the spring constant is varied depending upon the divergency of the arms with respect to the spring and the load to which the conductor holding member is subjected and a conductor holding member secured to the spring member adjacent its ends.

5. A conductor hanger comprising an elongated spring member, a suspension member attached to the spring member and having means to secure the hanger to an overhead support, arms projecting from opposite sides of the suspension member in divergent relation to the spring and arranged to be engaged by the spring member to gradually change the spring constant depending upon the load to which the conductor holding member is subjected and means secured to the spring member to receive and hold a conductor.

6. The combination with a trolley wire hanger comprising an elongated spring and a body secured to the spring and having a wire receiving and holding means along one edge, and a suspension member associated with the spring for securing the suspension member to a support, of rigid means associated with the suspension member and spaced from the spring in divergent relation thereto to be engaged by the spring to decrease the spring constant in accordance with the bending of the spring in one direction from its normal relative to its suspension member.

7. A support for a trolley wire holder, comprising an elongated spring, a suspension member associated with the spring and engaging the same intermediate the ends thereof, means associated with the suspension member and projecting therefrom in gradual divergence with respect to the spring and so further constructed and so arranged relative to the spring that the spring constant will be decreased as the load on the hanger increases and means associated with the spring for attaching thereto a trolley wire receiving device.

8. A hanger for suspending a trolley wire from a support comprising an elongated spring, a trolley wire holder attached to the spring adjacent its ends, a suspension member for the hanger associated with the spring intermediate its ends and rigid means projecting longitudinally from opposite sides of the suspension member in predetermined divergency with respect to the spring, the rigid means to be engaged by the spring at various points along the said means with a change of load upon the spring whereby the resistance of the spring to bending varies with the load upon the spring in accordance with predetermined requirements.

LOUIS A. MEISSE.